United States Patent [19]

Gump et al.

[11] 3,923,950

[45] Dec. 2, 1975

[54] PRODUCTION OF STABILIZED ACRYLIC FIBERS AND FILMS

[75] Inventors: Klaus Hannes Gump, Gillette; Dagobert Englebert Stuetz, Westfield, both of N.J.

[73] Assignee: Celanese Corporation, New York, N.Y.

[22] Filed: Nov. 18, 1971

[21] Appl. No.: 200,184

[52] U.S. Cl......... 264/182; 106/15 FP; 260/45.7 S; 260/45.7 R; 260/45.9 R; 260/45.95; 260/85.5 S; 264/29; 264/DIG. 19; 423/447
[51] Int. Cl.²......................................... C01B 31/02
[58] Field of Search...................... 269/29, 182, 211; 260/29.6 AN, 29.6 AQ, 30.8 R, 33.4 R, 32.6 R, 45.7 S, 45.7 R, 45.9 R, 45.95, 85.5 S; 23/209.1; 8/115.5; 117/137; 423/447; 264/DIG. 19; 106/15 FP

[56] References Cited
UNITED STATES PATENTS

| | | | |
|---|---|---|---|
| 2,560,053 | 7/1951 | Webb | 260/45.7 S |
| 2,661,344 | 12/1953 | Slocombe et al. | 260/45.7 |
| 2,689,236 | 9/1954 | Webb | 260/45.7 S |
| 2,772,250 | 11/1956 | Slocombe | 260/45.7 S |
| 2,799,915 | 7/1957 | Barnett et al. | 8/130.1 |
| 2,813,845 | 11/1957 | Wesp et al. | 260/45.7 S |
| 3,285,696 | 11/1966 | Tsunoda | 423/447 |
| 3,527,564 | 9/1970 | Moore et al. | 264/29 |
| 3,592,595 | 7/1971 | Gump | 264/29 |
| 3,594,455 | 7/1971 | Polovoi et al. | 264/29 |
| 3,647,770 | 3/1972 | Gump et al. | 264/236 |
| 3,656,882 | 4/1972 | Raggs | 8/115.5 |
| 3,656,883 | 4/1972 | Raggs | 8/115.5 |
| 3,656,904 | 4/1972 | Ram | 264/29 |
| 3,708,326 | 1/1973 | Chenevey et al. | 117/137 |
| 3,736,309 | 5/1973 | Gump et al. | 264/29 |
| 3,775,520 | 11/1973 | Ram et al. | 264/29 |
| 3,779,983 | 12/1973 | Edwardo et al. | 260/45.7 S |

*Primary Examiner*—Jay H. Woo

[57] ABSTRACT

An improved process is provided for the production of stabilized acrylic fibers and films. An organic antioxidant is incorporated in a solution of an acrylic polymer prior to forming an acrylic fibrous material or film from the same, and the resulting acrylic fibrous material or film having a minor quantity of the organic antioxidant incorporated therein is heated in an oxygen-containing atmosphere until a stabilized fibrous material or film is formed. The organic antioxidant advantageously serves to moderate the oxidative portion of the stabilization reaction and enables the cyclization portion thereof to proceed in the absence of substantial polymer chain degradation. The resulting stabilized fibrous material or film is flexible and non-burning, and may be utilized as a fire resistant fiber, fabric or film, or optionally carbonized or carbonized and graphitized to form a carbonaceous fibrous material or film.

12 Claims, No Drawings

PRODUCTION OF STABILIZED ACRYLIC FIBERS AND FILMS

BACKGROUND OF THE INVENTION

In the past procedures have been proposed for the conversion of fibers formed from acrylic polymers to a modified form possessing enhanced thermal stability. Such modification has generally been accomplished by heating a fibrous material in an oxygen-containing atmosphere at a moderate temperature for an extended period of time.

U.S. Pat. Nos. 2,913,802 to Barnett and 3,285,696 to Tsunoda disclose processes for the conversion of fibers of acrylonitrile homopolymers or copolymers to a heat resistant form. The stabilization of shaped articles of acrylonitrile homopolymers and copolymers in an oxygen-containing atmosphere involves (1) a chain scission and oxidative cross-linking reaction of adjoining molecules as well as (2) a cylization reaction of pendant nitrile groups. It is generally recognized that the rate at which the stabilization reaction takes place increases with the temperature of the oxygen-containing atmosphere. However, in the past the stabilization reaction must by necessity at least initially be conducted at relatively low temperatures (i.e., below about 300°C.), since the cyclization reaction is known to be exothermic in nature and must be controlled if the original configuration of the material undergoing stabilization is to be preserved. Accordingly the stabilization reaction has tended to be time consuming, and economically demanding because of low productivity necessitated by the excessive time requirements. Prior processes proposed to shorten the period required by the stabilization reaction include that disclosed in U.S. Pat. No. 3,416,874. See also the processes of our commonly assigned U.S. Pat. Ser. Nos. 777,901 (now U.S. Pat. No. 3,592,595) and 777,902 (now U.S. Pat. No. 3,647,770), filed Nov. 21, 1968.

While stabilized acrylic fibrous materials may be used directly in applications where a non-burning fiber is required, demands for the same have been increasingly presented by manufacturers of carbonized fibrous materials. Carbonized fibrous materials are commonly formed by heating a stabilized acrylic fibrous material in an inert atmosphere, such as nitrogen or argon, at a more highly elevated temperature. During the carbonization reaction elements such as nitrogen, oxygen, and hydrogen are substantially expelled. Accordingly, the term "carbonized" as used in the art commonly designates a material consisting of at least about 90 percent carbon by weight, and generally at least about 95 percent carbon by weight. Depending upon the conditions under which a carbonized fibrous material is processed, it may or may not contain graphitic carbon as determined by the characteristic X-ray diffraction pattern of graphite. See, for instance, commonly assigned U.S. Ser. No. 777,275, filed Nov. 20, 1968 (now abandoned), of Charles M. Clarke for a preferred procedure for forming continuous lengths of carbonized and graphitized fibrous materials from a stabilized acrylic fibrous material.

It is an object of the invention to provide an improved process for forming thermally stabilized shaped acrylic articles.

It is an object of the invention to provide an improved process for forming dimensionally stable flexible flame-proofed fibrous materials and films derived from an acrylic polymer.

It is an object of the invention to provide a process for forming thermally stabilized acrylic fibrous materials and films wherein degradation and chain scission within the acrylic precursor is substantially diminished.

It is an object of the invention to provide a process for forming stabilized fibrous materials or films wherein the thermal stabilization reaction of an acrylic fibrous material or film optionally may be conducted for a brief residence time at a more highly elevated temperature than heretofore commonly utilized.

It is another object of the invention to provide an improved process for forming stabilized fibrous materials and films derived from acrylic polymers which results in a product which is suitable for carbonization, or carbonization and graphitization.

It is a further object of the invention to provide a process for converting an acrylic fibrous material or film to a stabilized form possessing substantially the identical configuration as the starting material.

These and other objects, as well as the scope, nature, and utilization of the invention will be apparent from the following detailed description and appended claims.

SUMMARY OF THE INVENTION

It has been found that an improved process for the production of stabilized acrylic fibers and films which are capable of undergoing carbonization comprises:

a. providing a solution of (1) an acrylic polymer selected from the group consisting of an acrylonitrile homopolymer and acrylonitrile copolymers containing at least about 85 mol percent of acrylonitrile units and up to about 15 mol percent of one or more monovinyl units copolymerized therewith, (2) a minor quantity of an organic antioxidant capable of moderating the oxidative cross-linking reaction of adjoining acrylic molecules, and (3) a solvent for the acrylic polymer and the organic antioxidant, b. forming from the solution an acrylic fibrous material or film having incorporated therein a minor quantity of the organic antioxidant, and c. heating the resulting acrylic fibrous material or film in an oxygen-containing atmosphere at a temperature of about 200° to 360°C. until a stabilized fibrous material or film is formed which retains its original configuration substantially intact and which is non-burning when subjected to an ordinary match flame.

DESCRIPTION OF PREFERRED EMBODIMENTS

The acrylic polymer utilized as the starting material is formed primarily of recurring acrylonitrile units. For instance, the acrylic polymer should generally contain not less than about 85 mol percent of acrylonitrile units and not more than about 15 mol percent of units derived from a monovinyl compound which is copolymerizable with acrylonitrile such as styrene, methyl acrylate, methyl methacrylate, vinyl acetate, vinyl chloride, vinylidene chloride, vinyl pyridine, and the like, or a plurality of such monomers. The pendent nitrile groups present within the acrylic precursor are substantially uncyclized.

The preferred acrylic precursor is an acrylonitrile homopolymer. Preferred acrylonitrile copolymers contain at least about 95 mol percent of acrylonitrile units and up to about 5 mol percent of one or more monovinyl units copolymerized therewith.

The organic antioxidant utilized in the process is capable of moderating or inhibiting the oxidative crosslinking reaction of adjoining molecules, e.g., when heated in an oxygen-containing atmosphere at 200°C., or above. The organic antioxidant optionally may be a nitrogen-free phenolic antioxidant, an aminophenol antioxidant, a non-phenolic aromatic amine antioxidant, a quinone antioxidant, a sulfur-containing antioxidant, or mixtures of the foregoing. The organic antioxidants selected preferably have a melting point of at least 200°C.

The nitrogen-free phenolic antioxidants selected for use in the process may be either sterically hindered phenols or non-sterically hindered bisphenols. The phenols are considered to be sterically hindered for the purposes of the present description if at least one of the ring positions adjoining (i.e., ortho to) a hydroxyl group is occupied by a substituent other than hydrogen, e.g., halogen, an alkyl group, a methoxy group, etc. Also, the steric hindrance may be provided by an adjoining fused ring, such as in 1,5-naphthalenediol. Representative nitrogen-free phenolic antioxidants suitable for use in the process include:

tetrachlorohydroquinone, $[C_6H_2Cl_4O_2]$;
tetrabromohydroquinone, $[C_6H_2Br_4O_2]$;
tetraiodohydroquinone, $[C_6H_2I_4O_2]$;
tetrachlorobisphenol A, $[C_{15}H_{12}Cl_4O_2]$;
tetrabromobisphenol A, $[C_{15}h_{12}I_4O_2]$;
tetaiodobisphenol A, $[C_{15}H_{12}I_4O_2]$;
dichlorobisphenol A, $[C_{15}H_{14}Cl_2O_2]$;
dibromobisphenol A, $[C_{15}H_{14}Br_2O_2]$;
diiodobisphenol A, $[C_{15}H_{14}I_2O_2]$;
2,6-dichlorophenol, $[C_6H_4Cl_2O]$;
2,6-dibromo-4-tert-butylphenol, $[C_{10}H_{12}Br_2O]$;
2,6-dibromo-1,5-naphthalenediol, $[C_{10}H_6Br_2O_2]$;
2,6-di-tert-butyl-p-cresol, $[C_{15}H_{24}O]$;
2,6-di-tert-butylphenol, $[C_{14}H_{22}O]$;
1,5-naphthalenediol, $[C_{10}H_8O_2]$;
2,6-di-tert-butyl-4-methylphenol, $[C_{15}H_{24}O]$;
2,4-dimethyl-6-tert-butylphenol, $[C_{11}H_{18}O]$;
2,5-di-tert-amyl hydroquinone, $[C_{16}H_{26}O_2]$;
2,4-di-tert-amylphenol, $[C_{16}H_{26}O]$;
4,4'-butylidenebis(6-tert-butyl-m-cresol), $[C_{26}H_{38}O_2]$;
p,p'-bisphenol, $[C_{12}H_{10}O_2]$; and
bisphenol A, $[C_{15}H_{16}O_2]$.

Alkali or alkaline earth metal salts of the nitrogen-free phenolic antioxidants may also be selected for use in the process.

Representative aminophenol antioxidants suitable for use in the process include:

2,4,6-triaminophenol, $[C_6H_9N_3O]$;
2-aminophenol, $[C_6H_7NO]$;
2-amino-4-nitrophenol, $[C_6H_6N_2O_3]$;
N-lauroyl-p-aminophenol, $[C_{18}H_{29}NO_2]$;
N-phenyl-p-aminophenol, $[C_{12}H_{12}NO]$;
N-tert-butyl-p-aminophenol, $[C_{10}H_{15}NO]$;
N-isopropyl-p-aminophenol, $[C_9H_{13}NO]$; and
N-cyclohexyl-p-aminophenol, $[C_{12}H_{16}NO]$.

Alkali or alkaline earth metal salts of the aminophenol antioxidants may also be selected for use in the process.

The non-phenolic aromatic amine antioxidants for use in the process may be either a polyarylamine or a alkylarylamine. Representative nonphenolic aromatic amine antioxidants for use in the process include:
N-phenyl-1-naphthylamine, $[C_{16}H_{13}N]$;
N-phenyl-2-naphthylamine, $[C_{16}H_{13}N]$;
N,N'-di-sec-butyl-para-phenylenediamine, $[C_{14}H_{24}N_2]$;
4,4'-dioctyl-diphenylamine, $[C_{28}H_{43}N]$;
N,N'-di-isopropyl-para-phenylenediamine, $[C_{12}H_{20}N_2]$;
diphenylamine, $[C_{12}H_{11}N]$;
N-cyclohexylphenylamine, $[C_{12}H_{16}N]$;
4,4'-dimethoxydiphenylamine, $[C_{14}H_{15}NO_2]$;
N-tert-butylphenylamine, $[C_{10}H_{15}N]$;
N-isopropylphenylamine, $[C_9H_{13}N]$;
p-isopropoxydiphenylamine, $[C_{18}H_{23}NO_2]$;
N,N'-diphenyl-p-phenylenediamine, $[C_{18}H_{16}N_2]$;
N,N',di-2-naphthyl-p-phenylenediamine, $[C_{26}H_{20}N_2]$;
dihydroquinoline, $[C_9H_9N]$;
1,2-dihydro-2,2,4-trimethyl-6-dodecylquinoline, $[C_{24}H_{29}N]$; and
1,2-dihydro-2,2,4-trimethyl-6-phenylquinoline, $[C_{18}H_{18}N]$.

The non-phenolic aromatic amine antioxidants may additionally be selected from among the Schiff bases which are the reaction or condensation products of an aldehyde or ketone with an aromatic amine. For instance, commerically available antioxidants formed by the condensation of diphenylamine and acetone, or diphenylamine, acetone, and a formadehyde resin, may be selected. Such condensation products are available under the designations of BLE-25, AgeRite Superflex, Aminox, and BXA antioxidants.

The quinone antioxidants selected for use in the process possess a pair of carbonyl groups positioned upon a ring which lacks the conjugate structure characteristic of aromatic compounds. The other ring positions of the quinone may be substituted, i.e., be provided with at least one hydroxyl group, amine group, nitro group, alkyl group, etc., or fused to at least one aromatic ring. When a hydroxy quinone is selected it may optionally be provided in the form of its alkali or alkaline earth metal salt. Representative quinone antioxidants suitable for use in the process include:

chloranil, $[C_6Cl_4O_2]$;
chloranilic acid, $[C_6H_2Cl_2O_4]$;
1,4-naphthoquinone, $[C_{10}H_6O_2]$;
2,6-dichloro-p-benzoquinone, $[C_6H_2Cl_2O_2]$;
2-chloroanthroquinone, $[C_{14}H_7ClO_2]$;
2,3-dichloro-1,4-naphthoquinone, $[C_{10}H_4Cl_2O_2]$;
o-benzoquinone, $[C_6H_4O_2]$;
2,6-dimethyl-p-benzoquinone, $[C_8H_8O_2]$;
2,3,5,6-tetramethyl-p-benzoquinone, $[C_{10}H_{10}O_2]$;
1,4 naphthoquinone, $[C_{10}H_6O_2]$;
1-nitroanthroquinone, $[C_{14}H_7NO_4]$;
1-aminoanthroquinone, $[C_{14}H_9NO_2]$;
2-aminoanthroquinone, $[C_{14}H_9NO_2]$;
4,5-dichloro-1-nitroanthroquinone, $[C_{14}H_5Cl_2NO_4]$;
1,2-dihydroxyanthroquinone, $[C_{14}H_8O_2]$; and
phenanthrenequinone, $[C_{14}H_8O_2]$.

The sulfur-containing antioxidants selected for use in the process optionally may be thiazyl derivatives, dithiocarbamates, or condensation products of thiourea. Representative sulfur-containing antioxidants for use in the process include:
2-mercaptobenzothiazole, $[C_7H_5NS_2]$;
beta, beta'-dithiodipropionic acid, $[C_6H_{10}O_4S_2]$;
3,3'-thiodipropionic acid, $[C_6H_{10}O_4S]$;

bis(dimethylthiocarbamoyl)disulfide, [$C_6H_{12}N_2S_4$];
tetramethylthiuramdisulfide, [$C_6H_{12}N_2S_4$];
1,1'-thiodi-2-naphthol, [$C_{20}H_{18}O_2S$];
1,1'-thiobis(N-phenyl-2-naphtholamine),
 [$C_{20}H_{18}N_2O_2S$]; and
bis(N-phenyl-2-naphtholamine)sulfide,
 [$C_{20}H_{18}N_2O_2S_2$].

The sulfur-containing antioxidants may alternatively be provided as alkali or alkaline earth metal salts.

The particularly preferred organic antioxidant for use in the process is tetrachlorohydroquinone, chloranil, or chloranilic acid. The bromo- and iodo- homologs of tetrachlorohydroquinone are also preferred, as are the di- and tetra-halogenated (i.e., chloro-, bromo-, and iodo-) forms of bisphenol A.

Suitable solvents which may be utilized in the present process are capable of dissolving both the acrylic polymer and the organic antioxidant. Representative organic solvents include N,N-dimethylformamide N,N-dimethylacetamide, dimethyl sulfoxide, butyrolactone, and N-methyl-2-pyrrolidinone. The preferred solvents are those which are commonly utilized during the spinning of fibers from acrylonitrile homopolymers and copolymers. The particularly preferred solvents are N,N-dimethylformamide and N,N-dimethylacetamide.

The concentration of the acrylic polymer in the solvent may be varied widely, e.g., about 5 to about 30 percent by weight based upon the weight of the solvent. Preferred concentrations range from 10 to 25 percent acrylic polymer by weight based upon the weight of the solvent.

The organic antioxidant is present in the solution of acrylic polymer in a minor quantity, i.e., about 1 to 20 percent by weight based upon the weight of the acrylic polymer. In a preferred embodiment of the process the organic antioxidant is present in a concentration of about 1 to 10 percent by weight based upon the weight of the acrylic polymer.

In a preferred embodiment of the process wherein N,N-dimethyl-acetamide serves as solvent the solution of acrylic polymer and organic antioxidant additionally contains 0.1 to 5.0 percent by weight based upon the total weight of the solution (0.5 to 2.0 percent in a particularly preferred embodiment) of lithium chloride dissolved therein. The incorporation of lithium chloride serves the function of lowering and preserving upon standing the viscosity of the solution. The desired solution fluidity and mobility for spinning or casting are accordingly efficiently maintained even upon the passage of time.

The solution of the acrylic polymer and the organic antioxidant may be formed by any convenient technique. For instance, the acrylic polymer while in particulate form together with the organic antioxidant may be added to the solvent with stirring while maintained at about 10° to 100°C. (preferably 50° to 90°C.). It is recommended that any heating of the solution in excess of about 100°C. be of limited duration, i.e., no more than a few minutes, so that no substantial degree of cyclization of pendant nitrile groups within the acrylic polymer occurs while dissolved in the solvent.

The solution is preferably filtered, such as by passage through a plate and frame press provided with an appropriate filtration medium, prior to forming a fibrous material or film.

The solution containing the acrylic polymer and the organic antioxidant is preferably converted into a fiber or film by extrusion through a shaped orifice employing conventional solution spinning techniques (i.e., by dry spinning or wet spinning). As is known in the art, dry spinning is commonly conducted by passing the solution through an opening of predetermined shape into an evaporative atmosphere (e.g., nitrogen) in which much of the solvent is evaporated. Wet spinning is commonly conducted by passing the solution through an opening of predetermined shape into a suitable coagulation bath. Acrylic films may also be formed by casting wherein a layer of the solution is placed upon a support and the solvent evaporated.

When wet spinning is utilized in the fiber or film forming step of the process, a coagulation bath is selected which is capable of preserving a minor quantity of the organic antioxidant within the resulting fibrous material or film. More specifically, the bath preferably exhibits no propensity to leach out and dissolve the organic antioxidant below the minimum level required to moderate the oxidative cross-linking reaction of adjoining acrylic molecules during the subsequent heat treatment step (described hereafter). Such coagulation bath may inherently possess no substantial tendency to dissolve the organic antioxidant. Alternatively, the coagulation bath which is selected may have its inherent tendency to dissolve the organic antioxidant diminished by preliminarily dissolving a substantial quantity of the organic antioxidant, or other compound therein. A preferred wet spinning technique is disclosed in commonly assigned U.S. Ser. No. 28,545, filed Apr. 14, 1970 (now U.S. Pat. No. 3,657,409), which is herein incorporated by reference.

The shaped orifice or spinneret utilized during the extrusion may contain a single hole through which a single filament is extruded, and preferably contains a plurality of holes whereby a plurality of filaments may be simultaneously extruded in yarn form. The spinneret preferably contains holes having a diameter of about 50 to 150 microns when producing relatively low denier fibers having an as-spun denier of about 8 to 24 denier per filament. Alternatively, acrylic films of relatively thin thickness, e.g., about 1 to 10 mils, may be formed, when the extrusion orifice is a rectangular slit.

The resulting as-spun fibrous material or film is preferably maintained in a continuous length configuration throughout the process. At an intermediate point prior to heat treatment the fibrous material may alternatively be transformed into another fibrous assemblage, e.g., a tow, fabric, or yarn of greater total denier.

When the fibrous material is a continuous multifilament yarn, a twist may be imparted to the same to improve the handling characteristics. For instance, a twist of about 0.1 to 5 tpi, and preferably about 0.3 to 1.0 tpi may be utilized. Also a false twist may be used instead of or in addition to a real twist. Alternatively, one may select bundles of fibrous material which possess essentially no twist.

The fibrous material may be drawn in accordance with conventional techniques in order to improve its orientation. For instance, the fibrous material may be drawn by stretching while in contact with a hot shoe at a temperature of about 140° to 160°C. Additional representative drawing techniques are disclosed in U.S. Pat. Nos. 2,455,173; 2,948,581; and 3,122,412. It is recommended that fibrous materials prior to the heat treatment (described hereafter) be drawn to a single filament tenacity of at least about 3 grams per denier. If desired, however, the fibrous material may be more highly oriented, e.g., drawn up to a single filament tenacity of about 7.5 to 8 grams per denier, or more. Additionally, the acrylic films optionally may be either uniaxially or biaxially oriented prior to the heat treatment (described hereafter). Immediately prior to the heat treatment step the acrylic fibrous material or film commonly contains the organic antioxidant incorporated therein in a concentration of about 1 to 10 percent by weight based upon the weight of the acrylic polymer, and preferably in a concentration of about 5 to 10 percent by weight based upon the weight of the acrylic polymer.

The acrylic material containing the organic antioxidant incorporated therein is heated to an oxygen-containing atmosphere at a temperature of about 200° to about 360°C. until a stabilized fibrous product or film is formed which is capable of undergoing carbonization, retains its original configuration substantially intact and which is non-burning when subjected to an ordinary match flame. In a preferred embodiment of the process the oxygen-containing atmosphere is air. Preferred temperatures for the oxygen-containing atmosphere range from about 240° to 360°C., and most preferably about 270° to 315°C. If desired, the fibrous material or film may be exposed to a temperature gradient wherein the temperature is progressively increased.

For best results, uniform contact during the stabilization reaction with molecular oxygen throughout all portions of the organic antioxidant containing acrylic material is encouraged. Such uniform reaction conditions can best be accomplished by limiting the mass of fibrous material or film at any one location so that heat dissipation from within the interior of the same is not unduly impaired, and free access to molecular oxygen is provided. For instance, the acrylic fibrous material or film may be placed in the oxygen-containing atmosphere while wound upon a support to a limited thickness. In a preferred embodiment of the invention, the acrylic fibrous material or film is continuously passed in the direction of its length through the heated oxygen-containing atmosphere. For instance, a continuous length of the acrylic fibrous material or film may be passed through a circulating oven or the tube of a muffle furnace. The speed of passage through the heated oxygen-containing atmosphere will be determined by the size of the heating zone and the desired residence time.

The period of time required to complete the stabilization reaction within the oxygen-containing atmosphere is generally inversely related to the temperature of the atmosphere, and is also influenced by the denier of the acrylic fibrous material or the thickness of the film undergoing treatment, and the concentration of molecular oxygen in the atmosphere. Treatment times in the oxygen-containing atmosphere accordingly commonly range from about 5 to 600 minutes. For instance, representative residence times at specific temperatures are as follows:

| Temperatures | Residence Time |
| --- | --- |
| 200°C. | 600 minutes |
| 250°C. | 180 minutes |
| 360°C. | 5 minutes |

Regardless of the stabilization temperature selected within the range of about 200° to 360°C., the presence of the organic antioxidant within the acrylic fibrous material or film results in an accelerated cyclization portion of the stabilization reaction at a given temperature.

The stabilized acrylic fibrous materials or films formed in accordance with the present process are black in appearance, dimensionally stable, flexible, retain essentially the same configuration as the starting material, are non-burning when subjected to an ordinary match flame, commonly have a bound oxygen content of at least 7 (e.g., 7 to 12) percent by weight as determined by the Unterzaucher or other suitable analysis, and commonly contain from about 50 to 65 percent carbon by weight.

The theory whereby the organic antioxidants herein discussed serve to beneficially influence the stabilization reaction is considered complex and incapable of simple explanation. It is believed, however, that these compounds serve at least partially to moderate or to inhibit the destructive oxidative portion of the stabilization reaction which concomitantly tends to diminish polymer degradation and polymer chain scission. The cyclization portion of the reaction is accordingly permitted advantageously to proceed with reduced competition from the oxidative portion of the stabilization reaction. The presence of the organic antioxidant surprisingly enables the stabilization reaction to be successfully conducted at temperatures as high as 360°C. The ability for one to carry out the stabilization reaction at such a highly elevated temperature without sacrifice in product properties enables the overall stabilization reaction to be accelerated thereby increasing the overall efficiency of the reaction and rate of production.

When a shaped acrylic article, e.g., an acrylonitrile homopolymer fiber or film, which has not undergone any previous thermal stabilization, is placed in an oxygen-containing atmosphere at a temperature of about 300°C. or above, the shaped article immediately shrinks approximately 50 percent of its original length and finally crumbles thereby destroying its original configuration. If the shaped article is removed prior to such crumbling it will be extremely brittle and of little utility. Alternatively, if the shaped acrylic article has incorporated therein 1 to 10 percent by weight of an organic antioxidant as previously described (e.g., tetrachlorohydroquinone), upon undergoing an identical thermal treatment it is converted to a shiny black stabilized form with a retention of its original geometry and flexibility.

When a shaped acrylic article, e.g., an acrylonitrile homopolymer fiber or film, which has not undergone any previous thermal stabilization is heated in an oxygen-containing atmosphere from room temperature (i.e., 25°C.) at a rate of 20°C./minute, a 30 to 40 percent weight loss is observed when a temperature of about 300°C. is reached. This weight loss is accompanied by a spontaneous exotherm which is attributed to the cyclization of pendant nitrile groups and a simultaneous chain scission reaction with the evolution of low molecular weight products, e.g., $NH_3$, $HCN$, $CH_3CN$, etc. Alternatively, if the shaped acrylic article has incorporated therein 1 to 10 percent of an organic antioxidant (e.g., tetrachlorohydroquinone), upon undergoing an identical thermal treatment no explosive exotherm and no weight loss is observed when heating up to 425°C. Accordingly, the process of the present invention makes possible a lower weight loss during the stabilization reaction. The resulting stabilized products if subsequently converted to carbon fibers or films likewise produce a higher eventual carbon yield.

The stabilized fibrous material resulting from the stabilization treatment of the present invention is suitable for use in applications where a fire resistant fibrous material is required. For instance, nonburning fabrics may be formed from the same. As previously indicated, the stabilized acrylic fibrous materials are particularly suited for use as intermediates in the production of carbonized fibrous materials. Such amorphous carbon or graphitic carbon fibrous products may be incorporated in a binder or matrix and serve as a reinforcing medium. The carbon fibers may accordingly serve as a lightweight load bearing component in high performance composite structures which find particular utility in the aerospace industry.

The stabilized film resulting from the stabilization treatment is suitable for use in applications where a fire resistant sheet material is required. Such stabilized films may also be utilized as intermediates in the production of carbonized films. Such carbonized films may be utilized in the formation of lightweight high temperature resistant laminates when incorporated in a matrix material (e.g., an epoxy resin).

The following examples are given as specific illustrations of the invention. It should be understood, however, that the invention is not limited to the specific details set forth in the examples.

EXAMPLE I

A solution of an acrylic polymer is formed employing N,N-dimethylformamide as solvent while maintained at 50°C. Particulate acrylonitrile homopolymer is added to the solvent with stirring in a concentration of 15 percent by weight based upon the weight of the N,N-dimethylformamide. The acrylonitrile homopolymer exhibits an I.V. of 1.68 dl./g. at 25°C. when dissolved in N,N-dimethylformamide in a concentration of 0.5 percent by weight based upon the total weight of the solution. Tetrachlorohydroquinone is next dissolved in the polymer solution in a concentration of 10 percent by weight based upon the weight of the acrylonitrile homopolymer.

Following filtration, the solution is fed to a standard cup type spinneret having a circle of 40 holes each having a diameter of 100 microns. After passing through the spinneret, the solution is coagulated in a bath of ethylene glycol maintained at 25°C. to form a continuous length of acrylonitrile homopolymer yarn containing tetrachlorohydroquinone incorporated therein. The resulting yarn is washed in water to remove residual solvent, and is drawn at a draw ratio of about 5:1 by passage over a hot shoe at a temperature of about 140°C. The resulting washed and drawn fibers contain tetrachlorohydroquinone incorporated therein in a concentration of about 6 percent by weight, and the pendant nitrile groups of the acrylonitrile units present therein are substantially uncyclized.

The yarn is next stabilized on a continuous basis by passage for 7.5 minutes through a tube furnace provided with a circulating heated air atmosphere having a maximum temperature of 340°C. while axially suspended therein.

The resulting stabilized yarn is capable of undergoing carbonization, shiny black in appearance, flexible, has a textile-like hand, retains its original fibrous configuration substantially intact, is non-burning when subjected to an ordinary match flame, retains strength after glowing in a match flame, and has an oxygen content in excess of 8 percent by weight as determined by the Unterzaucher analysis.

In a control run, an identical sample of the acrylonitrile homopolymer yarn is passed through the tube furnace in an identical manner with the exception that it contains no tetrachlorohydroquinone. The control yarn is incapable of withstanding the 340°C. stabilization temperature and breaks.

The resulting stabilized yarn of Example I is carbonized and graphitized in accordance with the teachings of U.S. Ser. No. 777,275, filed Nov. 20, 1968 now abandoned, of Charles M. Clarke, which are herein incorporated by reference. The graphite yarn exhibits satisfactory tensile properties.

EXAMPLE II

Example I is repeated with the exception that chloranil is substituted for tetrachlorohydroquinone.
Substantially similar results are achieved.

EXAMPLE III

Example I is repeated with the exception that chloranilic acid is substituted for tetrachlorohydroquinone.
Substantially similar results are achieved.

EXAMPLE IV

Example I is repeated with the exception that 1,5-naphthalenediol is substituted for tetrachlorohydroquinone.
Substantially similar results are achieved.

EXAMPLE V

Example I is repeated with the exception that 2,4,6-triaminophenol is substituted for tetrachlorohydroquinone.
Substantially similar results are achieved.

EXAMPLE VI

Example I is repeated with the exception that N-phenyl-1-naphthylamine is substituted for tetrachlorohydroquinone.
Substantially similar results are achieved.

EXAMPLE VII

Example I is repeated with the exception that p,p'-bisphenol is substituted for tetrachlorohydroquinone.
Substantially similar results are achieved.

EXAMPLE VIII

Example I is repeated with the exception that 2-mercaptobenzothiazole is substituted for tetrachlorohydroquinone.
Substantially similar results are achieved.

EXAMPLE IX

Example I is repeated with the exception that the solution of acrylonitrile homopolymer and tetrachlorohydroquinone is extruded through a rectangular slit having a height of 8 mils into glycerin to form a film.

Following washing and biaxial orientation the resulting film containing about 6 percent by weight tetrachlorohydroquinone is suspended for 10 minutes in a circulating air oven provided at 340°C. wherein it is converted to a stabilized form while retaining its original configuration substantially intact. The resulting stabilized film is capable of undergoing carbonization, shiny black, flexible, non-burning when subjected to an ordinary match flame, and contains an oxygen content of about 8 percent by weight as determined by the Unterzaucher analysis.

EXAMPLE X

A thin layer of the solution of acrylonitrile homopolymer and tetrachlorohydroquinone of Example I is placed upon a flat support and the N,N-dimethylformamide solvent evaporated by contact with circulating hot air provided at 90°C.

Following washing and biaxial orientation the film contains about 6 percent tetrachlorohydroquinone by weight, and is stabilized as described in Example IX to produce substantially similar results.

In a control run, where no organic antioxidant is included in the acrylonitrile homopolymer solution, the resulting film upon exposure to the atmosphere of the circulating air oven becomes fragmented into brittle pieces which exhibit a total surface area of about 50 percent of the original area prior to such heat treatment.

In our commonly assigned U.S. Ser. No. 200,183, filed concurrently herewith, entitled "Stabilization of Acrylic Fibers and Films," is disclosed an improved stabilization process wherein a previously formed acrylic fiber or film is impregnated with an organic antioxidant prior to heating in an oxygen-containing atmosphere.

Although the invention has been described with preferred embodiments, it is to be understood that variations and modifications may be resorted to as will be apparent to those skilled in the art. Such variations and modifications are to be considered within the purview and scope of the claims appended hereto.

We claim:

1. An improved process for the production of stabilized acrylic fibers and films which are capable of undergoing carbonization comprising:
   a. providing a solution of (1) an acrylic polymer selected from the group consisting of an acrylonitrile homopolymer and acrylonitrile copolymers containing at least about 85 mol percent of acrylonitrile units and up to about 15 mol percent of one or more monovinyl units copolymerized therewith, (2) about 1 to 20 percent by weight based upon the weight of said acrylic polymer of an organic antioxidant having a melting point of at least 200°C. capable of moderating the oxidative cross-linking reaction of adjoining acrylic molecules selected from the group consisting of a nitrogen-free phenolic antioxidant, an aminophenol antioxidant, a non-phenolic aromatic amine antioxidant, a quinone antioxidant, a sulfur-containing antioxidant, and mixtures of the foregoing, and (3) a solvent for said acrylic polymer and said organic antioxidant selected from the group consisting of N,N-dimethylformamide, N,N-dimethylacetamide, dimethyl sulfoxide, butyrolactone, and N-methyl-2-pyrrolidinone, with said solution prior to step (b) being heated for insufficient duration to accomplish a substantial degree of cyclization of pendant nitrile groups within said acrylic polymer while dissolved in said solvent,
   b. forming from said solution by extrusion through a shaped orifice an acrylic fibrous material or film having incorporated therein about 1 to 10 percent by weight based upon the weight of said acrylic polymer of said organic antioxidant, and
   c. heating said resulting acrylic fibrous material or film in an oxygen-containing atmosphere at a temperature of about 200° to 360°C. until a stabilized fibrous material or film is formed which retains its original configuration substantially intact and which is non-burning when subjected to an ordinary match flame.

2. An improved process according to claim 1 wherein said resulting acrylic fibrous material or film contains said organic antioxidant in a concentration of about 5 to 10 percent by weight immediately prior to heating in said oxygen-containing atmosphere.

3. An improved process according to claim 1 wherein said organic antioxidant is a nitrogen-free phenolic antioxidant.

4. An improved process according to claim 1 wherein said organic antioxidant is an aminophenol antioxidant.

5. An improved process according to claim 1 wherein said organic antioxidant is a non-phenolic aromatic amine antioxidant.

6. An improved process according to claim 1 wherein said organic antioxidant is a quinone antioxidant.

7. An improved process according to claim 1 wherein said organic antioxidant is a sulfur-containing antioxidant.

8. An improved process according to claim 1 wherein said oxygen-containing atmosphere is provided at a temperature of about 240° to 360°C.

9. An improved process for the production of stabilized acrylic fibers and films which are capable of undergoing carbonization comprising:
   a. providing a solution of (1) an acrylic polymer selected from the group consisting of an acrylonitrile homopolymer and acrylonitrile copolymers containing at least about 85 mol percent of acrylonitrile units and up to about 15 mol percent of one or more monovinyl units copolymerized therewith, (2) about 1 to 20 percent by weight based upon the weight of said acrylic polymer of an organic antioxidant selected from the group consisting of tetrachlorohydroquinone, chloranil, chloranilic acid, and mixtures of the foregoing, and (3) a solvent for said acrylic polymer and said organic antioxidant selected from the group consisting of N,N-dimethylformamide, N,N-dimethylacetamide, dimethyl sulfoxide, butyrolactone, and N-methyl-2-pyrrolidinone, with said solution prior to step (b) being heated for insufficient duration to accomplish a substantial degree of cyclization of pendant nitrile groups within said acrylic polymer while dissolved in said solvent,
   b. extruding said solution through a shaped orifice to form an acrylic fibrous material or film having incorporated therein about 1 to 10 percent by weight based upon the weight of said acrylic polymer of said organic antioxidant, and
   c. heating said resulting acrylic fibrous material or film in an oxygen-containing atmosphere at a temperature of about 200° to 360°C. until a stabilized fibrous material or film is formed which retains its original configuration essentially intact and which is non-burning when subjected to an ordinary match flame.

10. An improved process according to claim 9 wherein an acrylic fibrous material is formed from said solution having incorporated therein said organic antioxidant.

11. An improved process according to claim 9 wherein said organic antioxidant is tetrachlorohydroquinone.

12. An improved process according to claim 9 wherein said oxygen-containing atmosphere is provided at a temperature of about 240° to 360°C.

* * * * *